United States Patent
Srivastava et al.

(10) Patent No.: US 10,042,636 B1
(45) Date of Patent: Aug. 7, 2018

(54) END-TO END PROJECT MANAGEMENT PLATFORM WITH ARTIFICIAL INTELLIGENCE INTEGRATION

(71) Applicant: Accenture Global Solutions Limited, Dublin (IE)

(72) Inventors: Krupa Srivastava, Chennai (IN); Mark Lazarus, Caulfield (AU); Rajendra T. Prasad, Bangalore (IN); Vijayaraghavan Koushik, Chennai (IN); Bhaskar Ghosh, Bangalore (IN); Mohan Sekhar, Bangalore (IN); Robin Nastri, Parker, CO (US); Arpan Shukla, Ahmedabad (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/645,491

(22) Filed: Jul. 10, 2017

(30) Foreign Application Priority Data

Apr. 11, 2017 (IN) .............................. 201741012862

(51) Int. Cl.
*G06F 9/44* (2018.01)
*G06N 99/00* (2010.01)
(Continued)

(52) U.S. Cl.
CPC ............... *G06F 8/70* (2013.01); *G06N 5/022* (2013.01); *G06N 99/005* (2013.01)

(58) Field of Classification Search
CPC ......... G06F 8/70; G06N 5/022; G06N 99/005
(Continued)

(56) References Cited

U.S. PATENT DOCUMENTS

| 6,957,186 B1 | 10/2005 | Guheen et al. |
| 9,582,408 B1 * | 2/2017 | Jayaraman .......... G06F 11/3688 |

(Continued)

OTHER PUBLICATIONS

Kulkarni Rajesh H et al: Integration of artificial intelligence activities in software development processes and measuring effectiveness of integration, IET Soft, The Institution of Engineering and Technology, Michael Faraday House, Six Hills Way, Stevenage, Herts. SGI 2AY, UK, vol. 11, No. 1, Feb. 1, 2017 (Feb. 1, 2017), pp. 18-26.

(Continued)

*Primary Examiner* — Ryan D. Coyer
(74) *Attorney, Agent, or Firm* — Harrity & Harrity, LLP

(57) ABSTRACT

One or more computing resources, of a project management platform, may implement a delivery tool layer to provide one or more tools associated with managing portions of a project. The one or more computing resources may implement an integration layer to integrate the one or more tools into the project management platform for the project. The one or more computing resources may implement a data acquisition layer to obtain data regarding the project. The one or more computing resources may implement an automation layer to automate tasks associated with the project. The automation layer may be associated with automating a set of development operations, a set of maintenance operations, a set of management operations, a set of testing operations, or the like. The one or more computing resources may implement an artificial intelligence (AI) layer to process data relating to the project using one or more AI integrations.

20 Claims, 5 Drawing Sheets

(51) Int. Cl.
  *G06N 5/02* (2006.01)
  *G06F 8/70* (2018.01)
(58) Field of Classification Search
  USPC .......................................................... 717/101
  See application file for complete search history.

(56) References Cited

U.S. PATENT DOCUMENTS

| | | | |
|---|---|---|---|
| 2004/0172612 A1 | 9/2004 | Kasravi et al. | |
| 2005/0097364 A1* | 5/2005 | Edeki ...................... | G06F 21/31 |
| | | | 726/4 |
| 2007/0220497 A1* | 9/2007 | Chudukatil ............... | G06F 8/71 |
| | | | 717/140 |
| 2010/0257505 A1* | 10/2010 | Hinchey ................... | G06F 8/10 |
| | | | 717/101 |
| 2011/0099532 A1 | 4/2011 | Coldicott et al. | |
| 2014/0201702 A1* | 7/2014 | Kaplinger ................ | G06F 8/76 |
| | | | 717/101 |

OTHER PUBLICATIONS

Mark Harman: The role of artificial 1-15 intelligence in software engineering, Realizing AI Synergies in Software Engineering, IEEE Press, 445 Hoes Lane, PO Box 1331, Piscataway, NJ 88855-1331 USA, Jun. 5, 2812 (Jun. 5, 2012), pp. 1-6.
Extended European Search Report corresponding to EP 18166794.0, dated May 29, 2018, 12 pages.

* cited by examiner

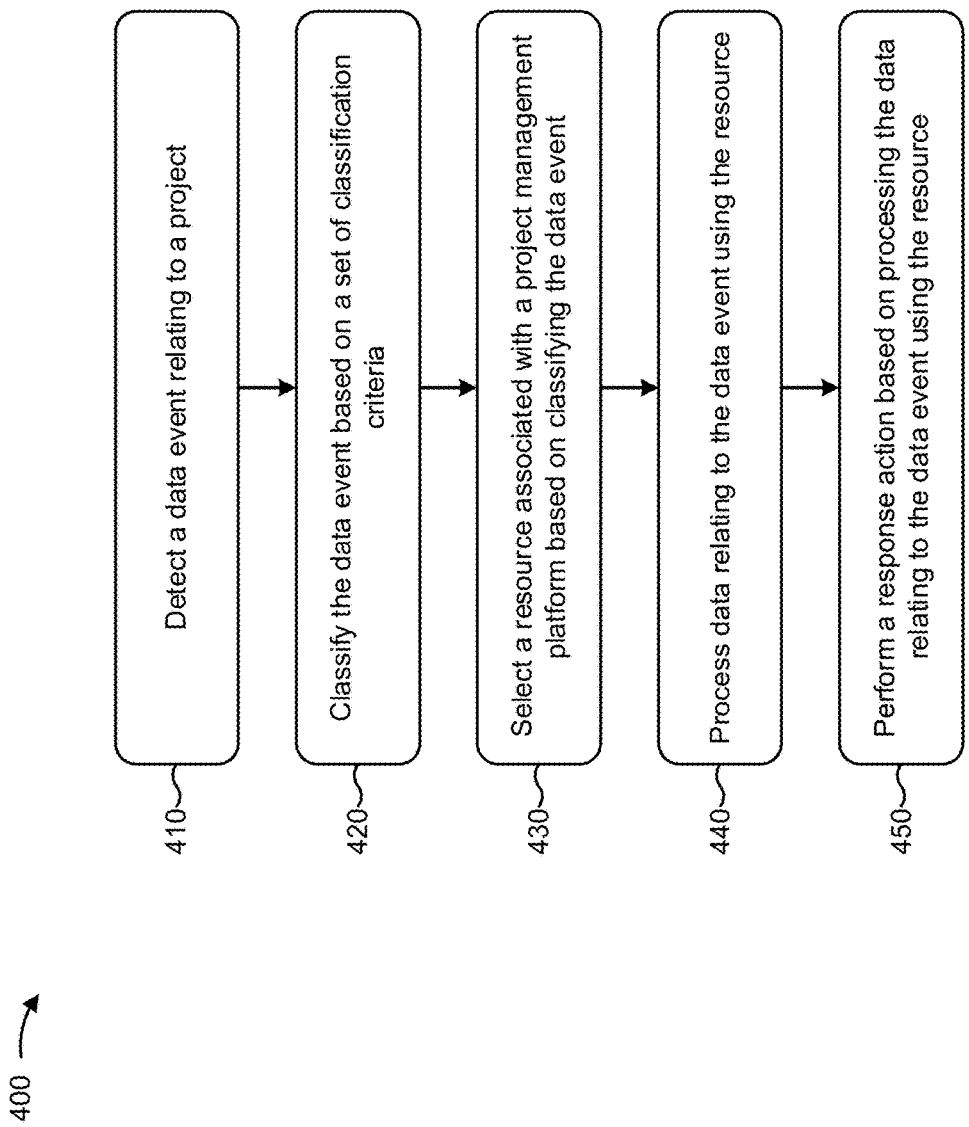

END-TO-END PROJECT MANAGEMENT PLATFORM WITH ARTIFICIAL INTELLIGENCE INTEGRATION

RELATED APPLICATION

This application claims priority under 35 U.S.C. § 119 to Indian Patent Application No. 201741012862, filed on Apr. 11, 2017, the content of which is incorporated by reference herein in its entirety.

BACKGROUND

Software development is generally, the end-to-end process of creating software programs for a system, embodying stages throughout a systems development life cycle. The traditional model of development, such as the waterfall model, may include the phases of identification of required software, analysis and specification of software requirements, software design, programming (i.e., coding), testing, and maintenance of code. Software project management includes involvement of the end users, communication among customers/clients, users, and software developers, articulation of project goals, accurate estimation of resources, and specification of system requirements.

SUMMARY

According to some possible implementations, a device may include one or more processors. The one or more processors may detect a data event related to a project associated with a project management platform. The project management platform may be associated with a compartmentalized liquid architecture configuration. The compartmentalized liquid architecture configuration may include a plurality of layers, including two or more of a delivery tool layer, an integration tool layer, a data acquisition layer, an automation layer, or an artificial intelligence layer. The one or more processors may classify the data event based on a set of classification criteria. The one or more processors may select a resource of a plurality of resources associated with the project management platform based on classifying the data event. The resource may be included in a particular layer of the plurality of layers. The one or more processors may process data relating to the data event using the resource. The one or more processors may perform a response action based on processing the data relating to the data event using the resource.

According to some possible implementations, a non-transitory computer-readable medium may store one or more instructions that, when executed by one or more processors, may cause the one or more processors to detect a data event related to a project associated with a project management platform. The project management platform may be associated with a compartmentalized liquid architecture configuration associated with a plurality of layers of resources. The one or more instructions, when executed by the one or more processors, may cause the one or more processors to classify the data event based on a set of classification criteria. The classification criteria may relate to a type of the data event, a source of the data event, a type of the project, or the like. The one or more instructions, when executed by the one or more processors, may cause the one or more processors to select a resource of a plurality of resources associated with the project management platform based on classifying the data event. The resource may be included in a particular layer of the plurality of layers. The one or more instructions, when executed by the one or more processors, may cause the one or more processors to process data relating to the data event using the resource. The one or more instructions, when executed by the one or more processors, may cause the one or more processors to perform a response action based on processing the data relating to the data event using the resource.

According to some possible implementations, a project management platform may include one or more computing resources. The one or more computing resources may implement a delivery tool layer to provide one or more tools associated with managing portions of a project. The one or more computing resources may implement an integration layer to integrate the one or more tools into the project management platform for the project. The one or more computing resources may implement a data acquisition layer to obtain data regarding the project. The one or more computing resources may implement an automation layer to automate tasks associated with the project. The automation layer may be associated with automating a set of development operations, a set of maintenance operations, a set of management operations, a set of testing operations, or the like. The one or more computing resources may implement an artificial intelligence (AI) layer to process data relating to the project using one or more AI integrations.

BRIEF DESCRIPTION OF THE DRAWINGS

FIG. 4 is a flow chart of an example process for orchestrating utilization of an end-to-end project management platform with artificial intelligence integration.

DESCRIPTION

Figure 1:
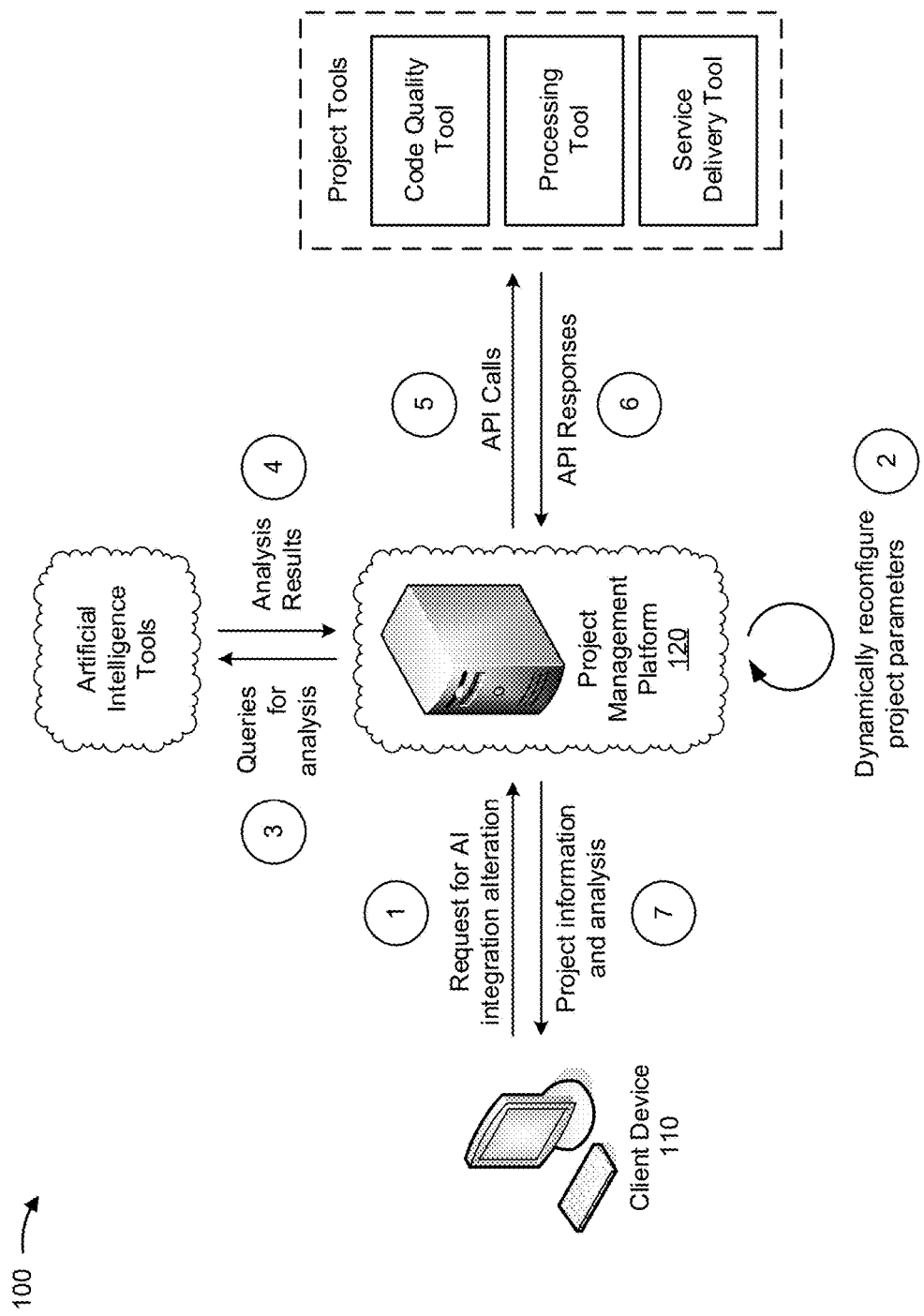
FIG. 1 is a diagram of an overview of an example implementation described herein.

The following detailed description of example implementations refers to the accompanying drawings. The same reference numbers in different drawings may identify the same or similar elements.

A project manager (e.g., a first party) may manage a software development project for a client (e.g., a second party). The project manager may manage a set of developers to author program code for the software development project to satisfy requirements provided by the client. For example, the client may provide requirements relating to accessibility, functionality, security, error management, and/or the like. After the project is completed, the client may test the program code to determine that the program code satisfies the requirements, and may publish the program code for use by a set of users. Another project manager may resolve ongoing issues relating to the program code. For example, when a user of the program code identifies an error, the user may submit a ticket relating to the error for resolution by the other project manager.

However, managing development of a project and/or ongoing use of the project may be resource intensive, while also being prone to human error. This may result in poor user experience, and may lead to excessive use of computing resources (e.g., from a person authoring program code, creating work schedules for subordinates, managing finances of a project, researching an issue, providing a failed recommendation for the issue, re-researching to identify another recommendation for the issue, etc.). In other cases, managing a project (with or without human intervention) may be difficult due to a project management platform receiving a large volume of data relating to multiple aspects of a project. This may result in high computer processing and/or storage costs. For example, applying a project management system in a field that uses big data may require classifying and/or processing tens of thousands, hundreds, thousands, or even millions of data points. Moreover, aspects a project may be managed 24 hours a day and 365 days a year, which may require excessive cost for human based monitoring. Furthermore, human based monitoring may be error prone, resulting in increased processing to correct human errors.

Implementations, described herein, may provide for a cloud platform to automatically manage multiple phases of a project, including a development phase of a project, a testing phase of a project, a use phase of a project, and/or the like. Moreover, the cloud platform utilizes a flexible architecture to permit dynamic alteration and integration of artificial intelligence and/or machine learning components to permit natural language based interaction with the cloud platform. In this way, the cloud platform reduces utilization of computing resources based on faster completion of projects and resolution of issues relating to a project (e.g., less resources may be needed to develop the project, resolve a ticket, etc.), reduces utilization of computing resources and/or network resources based on decreasing a period of time where a network device is using additional resources to complete a task (e.g., a network device may use less resources to complete a task when operating properly), improves scalability of project management (e.g., a network device can be configured to manage larger projects, additional aspects of the project, or the like without a delay associated with hiring new employees and training new employees and a computing resource utilization associated with providing computers for the new employees), and/or the like. By reducing the utilization of computing resources, the cloud platform improves overall system performance due to efficient and effective allocation of resources. Furthermore, faster completion of projects and resolution of issues relating to projects improves user experience and minimizes time lost due to project delays or a project issue (e.g., a user may be unable to use a software development platform when the software development platform is incomplete or experiencing a technical error).

FIG. 1 is a diagram of an overview of an example implementation 100 described herein. As shown in FIG. 1, and by reference number 1, client device 110 may access project management platform 120 by, for example, requesting alteration of an artificial intelligence (AI) integration. The AI integration may be used to analyze information (e.g., tickets, defects, etc.) sent from client device 110 to project management platform 120. The request may cause a data event associated with a software development project to be detected and classified as a changed resource by project management platform 120. At reference number 2, project management platform 120 may dynamically reconfigure (e.g., based on information from the AI integration) project parameters and alter resources of project management platform 120 based on classifying the data event. For example, project management platform 120 may change application programming interface (API) calls associated with the project, dependencies, interfaces, etc. to switch from a first AI integration to a second AI integration. In some implementations, project management platform 120 may change to using multiple AI integrations. For example, project management platform 120 may use a first AI integration for a first task (e.g., natural language processing) and a second AI integration for a second task (e.g., predictive analytics).

As further shown in FIG. 1, and by reference numbers 3 and 4, project management platform 120 may subsequently transmit a query for analysis by the second AI integration based on the reconfiguration and may receive a result of the analysis of the query. For example, based on receiving a ticket regarding an error with a development project, project management platform 120 may submit the ticket for natural language processing of a description of the error to determine a classification of the error and a resolution for the error. Similarly, based on receiving a project metric regarding the development project (e.g., an update to a task performed by a developer), project management platform 120 may query an AI integration to cause the AI integration to perform analytics on the project metric to determine an effect to a delivery schedule for the project. In this way, project management platform 120 may integrate different AI tools (e.g., external AI tools) into a user interface for project management (e.g., that is provided to, for example, a project manager), thereby enabling the project manager to change AI tools, utilize multiple different AI tools, and/or the like depending on relative performance capabilities, functionalities, etc. of the multiple different AI tools. As an example, multiple AI tools may be configured for common use cases, and a client may specify a particular AI tool for a particular use case, of multiple AI tools for the use case, based on a the particular AI tool providing a particular type of output, the particular AI tool being compatible with a client system, etc.).

As further shown in FIG. 1, and by reference numbers 5 and 6, project management platform 120 initiates API calls to a set of project tools of project management platform 120, and receives response from the project tools. For example, project management platform 120 performs the API calls based on the analysis results from the AI Tools. As an example, project management platform 120 may provide a set of queries to a first AI integration to provide a natural language chat functionality to a user of client device 110, determine a classification of an error based on information received via the natural language chat functionality and another set of queries to a second AI integration (e.g., to perform analytics), and may provide the classification of the error to a project tool associated with fixing errors in a development project. In this case, the project tool (e.g., an error recommendation tool) may generate a recommendation for fixing the error, and project management platform 120 may communicate with one or more other devices to fix the error (e.g., by generating replacement program code, rolling back an update, pushing out a new update, etc.).

As further shown in FIG. 1, and by reference number 7, project management platform 120 may provide project information and analysis to the user of client device 110. For example, project management platform 120 may generate a user interface providing end-to-end information regarding a development project, such as information identifying a resolution to an error, a message adapted to a format associated with a proprietary tool operating on client device 110, a response message relating to a virtual agent functionality, a project plan determined based on a set of requirements for a project, a result of analytics performed by an AI integration, and/or the like.

In this way, the project management platform can automatically manage multiple phases of a software development project and dynamically alter and integrate AI tools to permit natural language processing interaction (or another type of AI interaction, such as predictive modeling, trend prediction, machine learning analytics, etc.) with tools of the project management platform, analytics interaction with tools of the project management platform, and/or the like. By using a compartmentalized architecture (e.g., with different technology options, such as different AI resources, for the same or similar use cases that may be selected based on, for example, a client preference) that permits multiple different AI resources to be selected and applied to different parts of a project, the project management platform enables faster project completion, and a reduction in overall utilization of extraneous or unnecessary resources relative to another technique with a single AI resource configured to manage all aspects of a project. Moreover, the compartmentalized architecture, described herein, reduces an amount of time to change AI resources associated with a project, thereby reducing a utilization of processing resources associated with manually reconfiguring the project management platform when a user requests a change to the AI resources.

As indicated above, FIG. 1 is provided merely as an example. Other examples are possible and may differ from what was described with regard to FIG. 1.

Figure 2A:
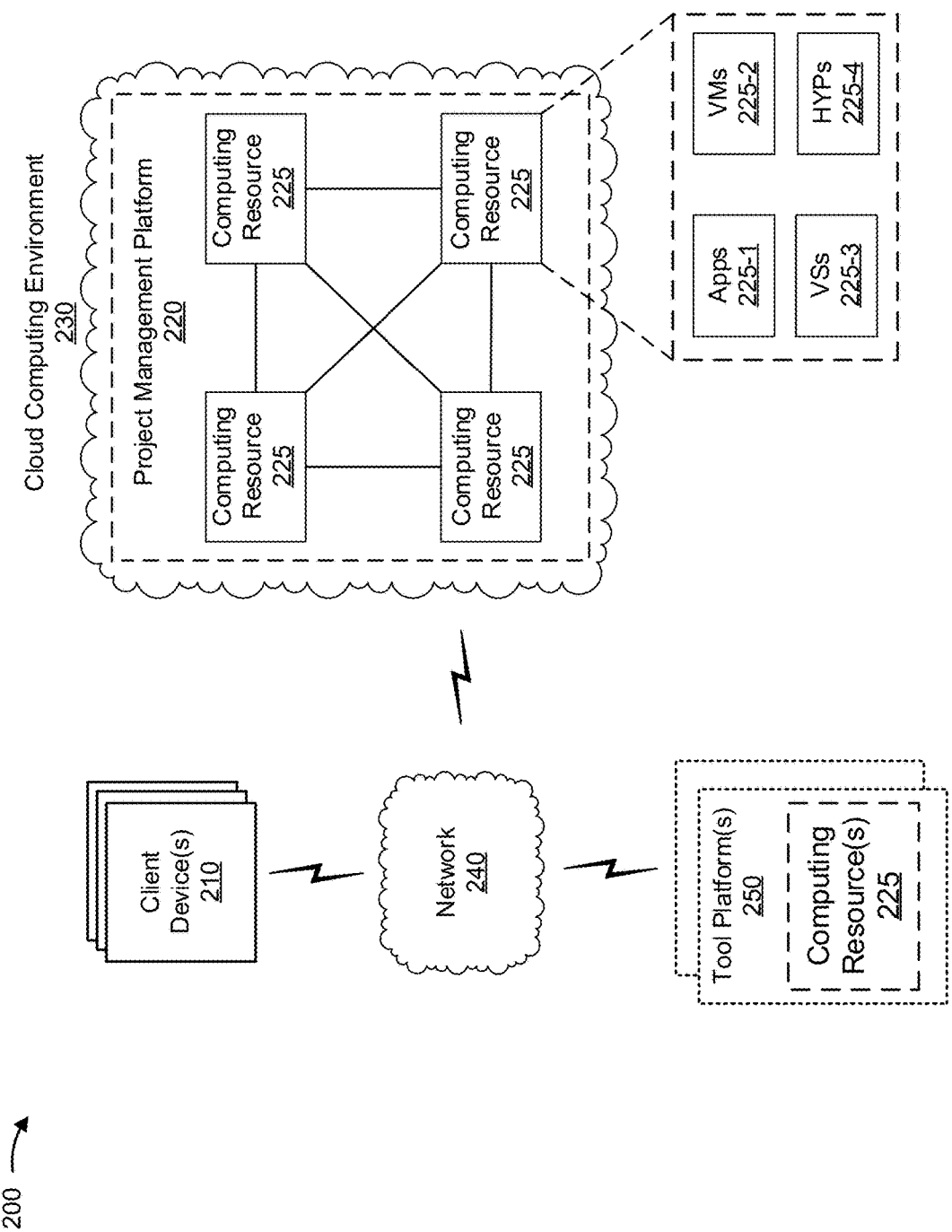
FIGS. 2A and 2B are diagrams of an example environment in which systems and/or methods, described herein, may be implemented.
Figure 2B:
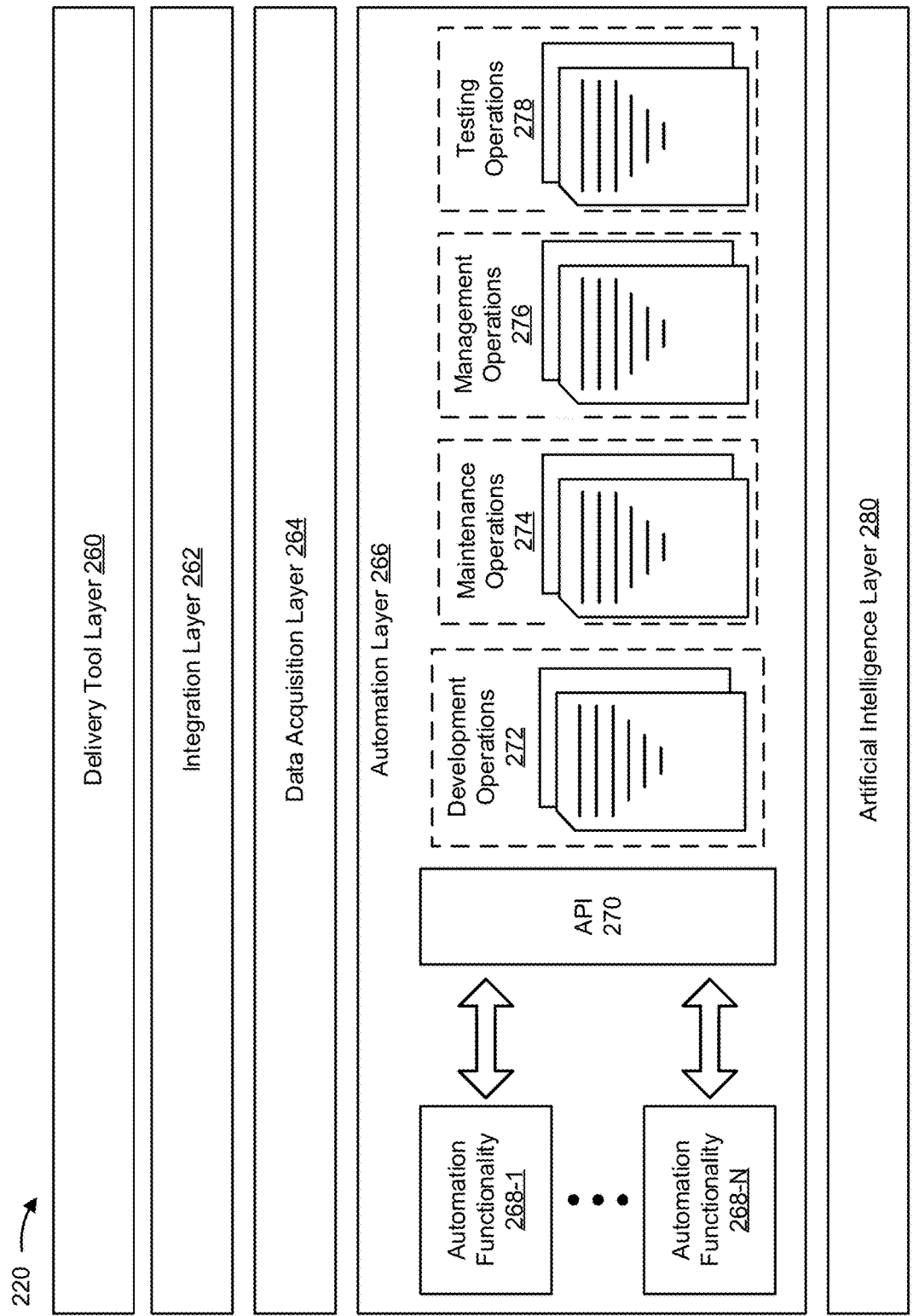

FIGS. 2A and 2B are diagrams of an example environment 200 in which systems and/or methods, described herein, may be implemented. As shown in FIG. 2A, environment 200 may include one or more client devices 210, project management platform 220 hosted within cloud computing environment 230, network 240, and tool platform 250. Devices of environment 200 may interconnect via wired connections, wireless connections, or a combination of wired and wireless connections.

Client device 210 includes one or more devices capable of receiving, generating, storing, processing, and/or providing information associated with a software development project. For example, client device 210 may include a communication and/or computing device, such as a mobile phone (e.g., a smart phone, a radiotelephone, etc.), a computer (e.g., a desktop computer, a laptop computer, a tablet computer, a handheld computer), a gaming device, a wearable communication device (e.g., a smart wristwatch, a pair of smart eyeglasses, etc.), or a similar type of device. In some implementations, client device 210 may provide, to project management platform 220, information associated with a data event relating to a software development project. Additionally, or alternatively, client device 210 may receive information associated with a software development project from project management platform 220. In some implementations, client device 210 corresponds to client device 110 shown in FIG. 1.

Project management platform 220 includes one or more devices capable of receiving, generating, storing, classifying, processing, and/or providing information associated with a project (e.g., a software development project), as described elsewhere herein. For example, project management platform 220 may include a cloud server or a group of cloud servers. In some implementations, project management platform 220 may communicate with client device 210 to obtain project information (e.g., source code relating to a project). Additionally, or alternatively, project management platform 220 may communicate with tool platform 250 to provide information to and/or obtain information from a tool operated by tool platform 250 (e.g., an artificial intelligence tool, another project management tool not co-located with project management platform 220, etc.). In some implementations, project management platform 220 corresponds to project management platform 120 shown in FIG. 1.

In some implementations, as shown, project management platform 220 may be hosted in cloud computing environment 230. Notably, while implementations described herein describe project management platform 220 as being hosted in cloud computing environment 230, in some implementations, project management platform 220 may not be cloud-based (i.e., may be implemented outside of a cloud computing environment) or may be partially cloud-based. Although implementations are described herein as classifying and resolving issues relating to a project development environment, project management platform 220 may be utilized to classify and resolve issues relating to other environments, such as a corporate environment, a governmental environment, an educational environment, and/or the like.

Cloud computing environment 230 includes an environment that hosts project management platform 220. Cloud computing environment 230 may provide computation, software, data access, storage, and/or other services that do not require end-user knowledge of a physical location and configuration of system(s) and/or device(s) that host project management platform 220. As shown, cloud computing environment 230 may include a group of computing resources 225 (referred to collectively as "computing resources 225" and individually as "computing resource 225").

In some implementations, cloud computing environment 230 may include other cloud computing resources, such as R based statistical computing resources (e.g., an R based algorithm to compute a ticket inflow rate of tickets relating to project issues, and perform allocation of computing resources based on ticket inflow rate), Microsoft Azure based computing resources (e.g., an Azure based AI resource, such as Microsoft Cortana, an Azure based algorithm, such as an algorithm to determine service level agreement compliance rates—failing to satisfy a threshold may indicate that a project has an issue and may cause a ticket to be automatically generated, and/or the like), Language Understanding Intelligent Service (LUIS) based computing resources (e.g., an AI resource for natural language processing), International Business Machines (IBM) Watson based computing resources (e.g., an AI resource to provide user interface functionalities, to perform natural language interfacing with users, to perform analytics, etc.), Google Analytics based computing resources (e.g., an AI resource to provide user interface functionalities, to perform analytics, etc.), and/or the like. In some implementations, one or more cloud computing resources may be co-located in cloud computing environment 230. Additionally, or alternatively, one or more cloud computing resources may be hosted in another cloud computing environment that may communicate with cloud computing environment 230. Integrating multiple tools designed for different project aspects (e.g., R for statistical analysis, Azure for big data computing of millions of data points relating to a project, Watson for natural language interfacing with a user), cloud computing environment 230 may enable project management platform 220 to effectively and automatically manage ticket resolution for a project, provide recommendations regarding a project, test a project, develop a project, and/or the like, thereby improving accuracy of coding, causing a reduction of coding errors, and/or the like. Such improvements may result in reduction of computing resources expended to complete the project, computing resources utilized when executing software managed or designed during a project, computing resources utilized to provide ongoing maintenance on a project (e.g., ticket resolution, project updates, etc.), and/or the like.

Computing resource 225 includes one or more personal computers, workstation computers, server devices, or another type of computation and/or communication device. In some implementations, computing resource 225 may host project management platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2A, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, and/or the like.

Application 225-1 includes one or more software applications that may be provided to or accessed by client device 210. Application 225-1 may eliminate a need to install and execute the software applications on client device 210. For example, application 225-1 may include software associated with project management platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., client device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Tool platform 250 includes a computing platform (e.g., a base software service), such as another cloud computing environment 230, a non-cloud computing based computing platform, and/or the like that provides a set of tools for utilization by project management platform 220. For example, tool platform 250 may include a server providing a ticket tracking tool, a defect management tool, an agile workflow tool, an artificial intelligence (AI) tool, a machine learning tool, an analytics tool, and/or the like. In some implementations, tool platform 250 may operate on client device 210. For example, client device 210 may include one or more tools that execute on client device 210, which may provide computing resources 225 for the one or more tools.

FIG. 2B is a diagram of an example components of project management platform 220. As shown in FIG. 2B, project management platform 220 may include delivery tool layer 260, integration layer 262, data acquisition layer 264, automation layer 266, and artificial intelligence (AI) layer 280. As further shown, automation layer 266 may include automation functionality 268, API 270, development operations 272, maintenance operations 274, management operations 276, and testing operations 278. As shown, project management platform 220 may adopt a compartmentalized liquid architecture configuration (i.e., an architecture that includes a set of layers with each layer including resources and compartmentalized using one or more interfaces, such as one or more APIs) (e.g., which allows a use case to be implemented using one or more resources of a set of resources capable of managing the use case, such as a software development use case, a ticket management use case, etc., and a particular resource to manage multiple use cases) that operates different functionalities as compartmentalized components of project management platform 220 that are managed using an orchestration service. In this way, applications provided via project management platform 220 may be dynamically reconfigured or altered based on a user request. For example, a user may request to switch from using Cortana for AI services to using Watson for AI services, and reconfiguration may be performed by altering a set of dependencies and API calls, and without recoding each component of project management platform 220. Similarly, the orchestration service may automate tasks by compartmentalizing interactions between different portions of project management platform 220 into a set of data events that can be analyzed for automation by an AI service. Moreover, the orchestration service can dynamically reallocate computing resources 225 based on a projected computational complexity of a processing task, storage task, and/or the like relating to a data event, thereby enabling more efficient utilization of cloud computing environment 230 relative to a non-compartmentalized approach.

Delivery tool layer 260 operates on one or more computing resources and is associated with providing information associated with a set of tools that are external to project management platform 220. For example, delivery tool layer 260 provides virtualized instances of tools operating on tool platform 250 (e.g., client-side tools) to permit a user of client device 210 to integrate functionalities into project management platform 220 that are associated with tools not co-located with project management platform 220. In this way, a user of client device 210 can utilize tools providing functionalities not already included in project management platform 220, and project management platform 220 can integrate the functionalities of the tools into a user interface provided by project management platform 220. In some implementations, tools that may be used in association with delivery tool layer 260 may include manages service providers (MSPS) tools, ServiceNow project management tools, RationalPlan project management tools, JIRA by Atlassian tools, Application Lifecycle Management (ALM) & Test Suite tools by Hewlett Packard (HP), Solution Manager (Solman) by SAP, Remedy Change Management by BMC, SonarQube code quality tools, and/or the like.

Integration layer 262 operates on or more computing resources and is associated with integrating tools virtualized using delivery tool layer 260 and operating on tool platform 250. For example, integration layer 262 permits a tool external to project management platform 220 to be adapted for use with project management platform 220 without a change to program code (and/or without customization or with minimal customization, such as less than a threshold amount of time to customize or a threshold amount of code to author to customize) of the tool. In some implementations, integration layer 262 may utilize one or more data models (e.g., a canonical data model) and a set of tool adapters to adapt data associated with a tool between a first data format usable by project management platform 220 and a second data format usable by a client-side tool virtualized in delivery tool layer 260 and executing on tool platform 250. In some implementations, integration layer 262 may utilize and/or include one or tools such as an API (e.g., RESTful APIs), a service buses (e.g., an enterprise service bus (ESB), such as IBM Integration Bus (IIB), Message Queue (MQ) services, etc.), an adaptation tool, a SPLUNK instance, a Microsoft .NET adapter, an Azure Event & Notification hub adapter, a Microsoft Bots Framework adapter, a Java adapter, a set of monitors (e.g. to monitor one or more external feeds, social feeds, websites, portals, etc.), and/or the like.

Data acquisition layer 264 operates on one or more computing resources and is associated with obtaining data for utilization by project management platform 220. For example, data acquisition layer 264 may access external systems, such as client device 210, tool platform 250, a website, a database, a data structure, etc. to obtain data. In some implementations, data acquisition layer 264 may generate transactional data, and may enhance obtained data with the transactional data. For example, when data acquisition layer 264 obtains data from a data source, data acquisition layer 264 may enhance the data with transactional data identifying the data source, a time of data acquisition, and/or the like. In some implementations, data acquisition layer 264 may include and/or utilize one or more data lakes (e.g., Azure data lakes), transactional stores, SQL servers, IBM Watson data sources, SPLUNK data sources, Cortana intelligence data sources, and/or the like. In some implementations, data acquisition layer 264 may utilize a machine learning engine to apply one or more machine learning algorithms to data acquisition (e.g., a machine learning algorithm to determine data sets that are to be acquired for processing).

Automation layer 266 operates one or more computing resources and is associated with providing a set of automation functionalities 268. For example, automation layer 266 may include an automation functionality 268 associated with automating project management, automating a virtual agent, automating lifecycle management for a project, automating ticket management for a project, automating tool integration for tools integrated using integration layer 262, and/or the like. Automation layer 266 may provide an API 270 for automation functionalities 268 to perform development operations 272 (e.g., developing a project, coding a project, etc.), maintenance operations 274 (e.g., resolving tickets for a project, developing updates for a project to patch errors, etc.), management operations 276 (e.g., providing services for a project, managing other operations of a project, etc.), and/or testing operations 278 (e.g., determining compliance of a project with a set of standards, certifying compliance of the project, etc.), and/or the like. For example, automation layer 266 may provide an automation functionality relating to visualization (e.g., SPLUNK, Power BI by Microsoft to perform business analytics and analyze data regarding a project to generate a visualization, Tableau to perform analytics and/or generate visualizations regarding the data, etc.), reporting and/or analytics (e.g., R, SQL Server Analytics Services, SQL Server Reporting Services), and/or other types of tools to automate tasks associated with project development and management (e.g., speech synthesis tools, SPLUNK, Sharepoint by Microsoft, Chef configuration management software, Azure Machine Learning, Puppet configuration management software, Cortana, Watson, Jeeves enterprise resource planning (ERP) system software, AppDynamics by Cisco, SolarWinds network monitoring software, .NET, crowd sourcing tools, user created tools, etc.). In some implementations, automation layer 266 may provide an automation store resource (e.g., an application store permitting selection of automation layer resources that are to be activated for a particular project), a command center resource (e.g., a resource associated with generating an end-to-end user interface to integrate data from multiple other resources for a project), a virtual agent resource (e.g., one or more virtual agents to provide natural language interaction via a user interface), an automation arcade resource (e.g., a component to manage a workflow, such as submitting projects for a review process and publishing the projects based on completion of the review process, generating reports on data, generating RESTful APIs, etc.), and/or the like.

Artificial intelligence (AI) layer 280 operates one or more computing resources and is associated with integrating artificial intelligence functionalities into project management platform 220 for data analysis, user interaction, automated response action recommendation, and/or the like. For example, AI layer 280 may provide Cortana based tools, Alexa based tools, Siri based tools, Google Analytics based tools, Watson based tools, and/or the like. In some implementations, AI layer 280 may include tools that are no co-located with project management platform 220. For example, Watson may execute in an environment separate from project management platform 220. In this case, AI layer 280 may provide a virtualized instance of, for example, Watson, to permit communication between Watson and other resources of project management platform 220, to permit plug-and-play reconfiguration of AI resources for project management platform 220 (e.g., to permit, for example, Watson to be replaced by Cortana by removing a virtualized instance of Watson and instantiating a virtualized instance of Cortana, and without reconfiguring each resource of project management platform 220). AI layer 280 may integrate without external communication channels, such as a Skype communication channel, an instant messaging communication channel, a text messaging communication channel, an email communication channel, etc.

The number and arrangement of devices and networks shown in FIGS. 2A and 2B are provided as an example. In practice, there may be additional devices, fewer devices and/or networks, different devices and/or networks, or differently arranged devices and/or networks than those shown in FIGS. 2A and 2B. Furthermore, two or more devices shown in FIGS. 2A and 2B may be implemented within a single device, or a single device shown in FIGS. 2A and 2B may be implemented as multiple, distributed devices. Additionally, or alternatively, a set of devices (e.g., one or more devices) of environment 200 may perform one or more functions described as being performed by another set of devices of environment 200.

Figure 3:
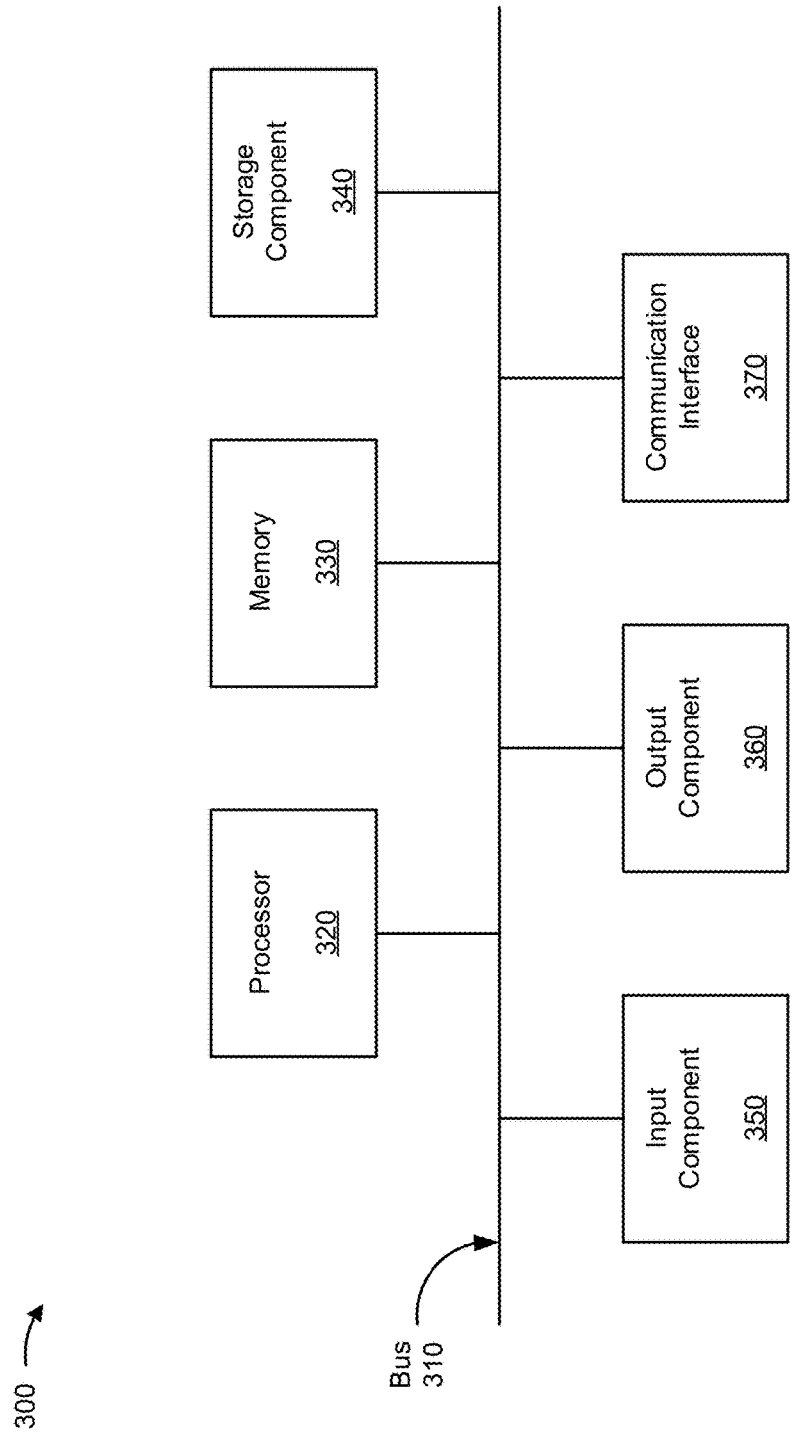
FIG. 3 is a diagram of example components of one or more devices of FIGS. 2A and 2B.

FIG. 3 is a diagram of example components of a device 300. Device 300 may correspond to client device 210, project management platform 220, and/or tool platform 250. In some implementations, client device 210, project management platform 220, and/or tool platform 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for orchestrating utilization of an end-to-end project management platform with artificial intelligence integration. In some implementations, one or more process blocks of FIG. 4 may be performed by project management platform 220. In some implementations, one or more process blocks of FIG. 4 may be performed by another device or a group of devices separate from or including project management platform 220, such as client device 210 and/or tool platform 250.

As shown in FIG. 4, process 400 may include detecting a data event relating to a project (block 410). For example, project management platform 220 may detect the data event relating to the project. A data event may include an event that causes data to be generated, and subsequently detected by project management platform 220. For example, a data event may include using a project management platform 220 (e.g., use of a user interface, interaction with a user interface, logging on to project management platform 220); project management platform 220 receiving a requirement for a project, receiving a change requirement for a project (e.g., an alteration to a requirement), detecting an alteration to a project (e.g., a developer completes a task, a set of developers completes a phase of the project, a developer generates code, a developer runs a test, etc.), detecting a calendar event (e.g., a project deadline occurs, is imminent, is expired, etc.), detecting an error, receiving a ticket identifying an issue (e.g., an error, a complaint, user feedback, etc.), receiving output from a tool (e.g., a proprietary tool operated by a user of the project management platform); and/or the like. Additionally, or alternatively, portions of project management platform 220 may also generate data events (e.g., a virtual agent module generates a data event to use an artificial intelligence tool of an artificial intelligence module to process a response from a user, a ticket resolution module generates a data event to use an artificial intelligence tool to process natural language of a ticket, a tool adaptation module generates a data event to obtain data regarding a project to classify the project, etc.). A project may include a software development project, maintenance operations for a software development project (e.g., monitoring use, resolving tickets, etc.), and/or the like. Although described herein in terms of a software development project, the project may include other types of projects, such as a development of a consumer product, a service offering, and/or the like.

Project management platform 220 may detect the data event based on receiving data. For example, project management platform 220 may receive data from client device 210 based on a user using client device 210. Similarly, project management platform 220 may receive data from tool platform 250 based on tool platform 250 executing an external tool. Additionally, or alternatively, project management platform 220 may detect the data event based on obtaining data from a data source. For example, project management platform 220 may obtain data based on automatically accessing a portal to obtain information relating to a requirement. Additionally, or alternatively, project management platform 220 may detect the data event based on detecting satisfaction of a criterion (e.g., date expiration, time expiration, etc.), monitoring a project (e.g., monitor use of an integrated development environment (IDE) associated with project management platform 220 to develop code for the project), and/or the like.

Based on automatically detecting data events, project management platform 220 reduces a likelihood that project management platform 220 fails to respond to a data event associated with a project relative to a person monitoring tens of thousands or hundreds of thousands of data events relating to a project. In this way, project management platform 220 reduces utilization of computing resources.

In this way, project management platform 220 detects a data event relating to a project.

As further shown in FIG. 4, process 400 may include classifying the data event based on a set of classification criteria (block 420). For example, project management platform 220 may classify the data event based on the set of classification criteria. Classification criteria may include factors in classifying a data event. For example, project management platform 220 may determine factors, such as a type of data event (e.g., a schedule type, a task type, a user interface interaction type, etc.), a project to which the data event applies (e.g., based on a project name, a project identifier, etc.), a classification relating to a project (e.g., a type of project, a type of client for the project, a size of the client, an industry of the client, etc.), and/or the like.

Project management platform 220 may classify a data event to determine a resource of project management platform 220 that is to process the data event. For example, project management platform 220 may determine, based on a data event (e.g., a type of data event, such as a schedule type, a user interface interaction type, an incoming message from a proprietary tool for adaptation, etc.), that a particular resource is to be provided the data event, such as a data event relating to a schedule being provided to a project plan management resource for processing, a data event relating to a ticket being provided to a ticket resolution resource for processing, and/or the like.

In some implementations, project management platform 220 may classify a data event based on project data identifying a type of task that is being managed using project management platform 220 (e.g., an agile delivery task, a ticket management task, a testing task, a configuration task, etc.). For example, a data event for an agile delivery project may be classified to be processed using an agile delivery management resource. In contrast, a data event relating to a ticket management project may be classified to be processed by a ticket resolution resource. In some implementations, project management platform 220 may obtain project data to classify the data event based on the type of task being managed using project management platform 220. Project data may include a project plan, sprint plan, resource information, change requests, defects, incidents, problems, work requests, quantitative metrics (e.g., completed tasks, hours worked, employees assigned to projects), qualitative metrics (e.g., grades given to tasks, employee reviews, information identifying a skill set of employees, etc.), and/or the like.

In some implementations, project management platform 220 may provide a user interface to client device 210 to permit a user to specify project data. Additionally, or alternatively, client device 210 may process a document (e.g., a design document, a requirements document, etc.) using natural language processing (NLP), machine learning (ML), artificial intelligence (AI), and/or the like, to extract project data. Additionally, or alternatively, project management platform 220 may crawl the web, perform API calls, identify similar projects, and/or the like to obtain data regarding similar projects. In some implementations, project management platform 220 may classify another project as similar to a project based on a type of client, a size of a client, an industry of a client, a set of requirements, and/or the like.

In some implementations, project management platform 220 may process project data to determine a type of a project or classify the project. For example, project management platform 220 may use analytics tools (e.g., a rules engine, a cognitive computing engine, etc.) trained on a training set of data regarding projects to analyze the project and a group of other projects, generate a score for the group of other projects representing a similarity to the project, and select one or more projects with a threshold score as similar projects. In some implementations, project management platform 220 may classify a project as a similar project based on geography, industry, technology, a combination thereof, etc. In this case, project management platform 220 may classify the data event based on a classification of data events associated with similar projects. In some implementations, project management platform 220 may determine rules for a rules engine based on a delivery type (e.g., agile delivery, application delivery, application maintenance, factory management, etc.), based on a rubric for delivery type, and/or the like. In some implementations, project management platform 220 may analyze thousands, hundreds of thousands, and/or the like of prior projects to train a cognitive computing engine (e.g., using one or more big data techniques).

In some implementations, project management platform 220 may classify the data event based on severity, a portion of a project to which an alert applies, a delivery type to which an alert applies, or the like. In some implementations, project management platform 220 may classify a data event to detect an alert condition. An alert condition may be related to a task, schedule, budget, or a particular issue (e.g., some alerts associated with high priority may be queued ahead of other alerts with low priority for processing). In this way, it is less likely that the resolution of a critical problem will delayed by a delay in processing billions of data events.

In this way, project management platform 220 may classify the data event based on the set of classification criteria.

As further shown in FIG. 4, process 400 may include selecting a resource associated with a project management platform based on classifying the data event (block 430). For example, project management platform 220 may select the resource associated with project management platform 220 to process the data event based on classifying the data event. A resource may include a portion of project management platform 220 or a proprietary tool (e.g., integrated into project management platform 220 using an adaptation tool to perform data adaptation, integrated into project management platform 220 based on a set of configured API calls, etc.) to receive the data event for processing. For example, resources of delivery tool layer 260 may include resources for providing information associated with tools operated by tool platform 250, such as tools that are external to project management platform 220 (e.g., MSPS, Service Now, Rational, JIRA, ALM & Test Suite, Solman, Remedy, SonarQube, and/or the like). Additionally, or alternatively, resources of integration layer 262 may include resources associated with adapting data events for processing by tools of tool platform 250. Additionally, or alternatively, resources of data acquisition layer 264 may include resources for obtaining data externally (e.g., from client device 210, tool platform 250, a website, a database, etc.). Additionally, or alternatively, resources of automation layer 266 may include resources for providing automation functionalities 268. For example, automation layer 266 may provide an API 270 for automation functionalities 268 to perform development operations 272, maintenance operations 274, management operations 276, testing operations 278, or another type of operation (e.g., configuration operations). Additionally, or alternatively, resources of AI layer 280 may include resources for integrating artificial intelligence functionalities in project management platform 220 (e.g., to perform data analysis, user interaction, automated response action, and/or the like).

Project management platform 220 may select a resource based on classifying the data event. For example, project management platform 220 may select a ticket management resource for receiving a ticket based on classifying the data event as a ticket, or a data acquisition resource for receiving requests for project data based on classifying the data event as a request for project data (e.g., from another resource of project management platform 220), etc. In some implementations, project management platform 220 may use an orchestration layer to select resources for each data event. In some implementations, project management platform 220 may queue data events for each resource (e.g., based on severity of an error, based on importance of the data event, based on time-sensitivity of the data event, etc.).

Additionally, or alternatively, project management platform 220 may obtain a resource to use to process the data event based on classifying the data event. For example, project management platform 220 may determine that the data event relates to a phase of a project, project management platform 220 may crawl the web to identify a tool for managing the phase of the project, and may integrate the tool to process the data event and manage the phase. In some implementations, project management platform 220 may change resources that process data events based on a data event (e.g., a client request to switch from using a first tool to a second tool for processing other data events). For example, project management platform 220 may change from a first AI resource (e.g., Cortana) to a second AI resource (e.g., Watson) to perform AI analytics, natural language processing, etc. for a client project. In this case, project management platform 220 may dynamically alter resources of project management platform 220 to change invocations, API calls, data storage locations, permissions, and/or interfaces associated with the client project to match the second AI resource. In this way, project management platform 220 dynamically changes AI integrations using a compartmentalized liquid architecture.

Additionally, or alternatively, project management platform 220 may utilize different sets of resources for different portions of the same project. For example, project management platform 220 may utilize Watson for a ticket management portion of a project and may utilize Google analytics for a trend management portion of a project (e.g., requirements inflow trends analysis, ticket inflow trends analysis, etc.). In this case, project management platform 220 may dynamically classify a first ticket as a particular type (e.g., code error) and select a first AI resource for processing the first ticket based on a characteristic of the first ticket (e.g., the particular type) and a characteristic of the first AI resource (e.g., that the first AI resource provides code generation functionalities), and classify a second ticket as a different type (e.g., user interface error) and select a second AI resource for processing the second ticket based on a characteristic of the second ticket (e.g., the different type) and a characteristic of the second AI resource (e.g., that the second AI resource provides layout management functionalities for user interface generation).

In this way, project management platform 220 may select a resource associated with project management platform 220 based on classifying the data event.

As further shown in FIG. 4, process 400 may include processing data relating to the data event using the resource (block 440). For example, project management platform 220 may process the data relating to the data event using the resource based on selecting the resource. The data may include data underlying the data event, such as program code generated, information identifying tasks completed or phases completed, problem descriptions included in tickets received, a description of a requirement received, and/or the like. In some implementations, project management platform 220 may process data by executing program code. For example, project management platform 220 may automatically test program code of a data event relating to generation of program code to determine that the program code satisfies a quality metric, a requirement, etc. Additionally, or alternatively, project management platform 220 may determine that a deadline has expired and that a project plan is to be changed based on a data event relating to the deadline expiring. Additionally, or alternatively, project management platform 220 may determine an error identified in a ticket based on a natural language description of the error processed using a natural language processing technique. For example, project management platform 220 may use an AI integration (e.g., that provides a natural language processing functionality, a machine learning functionality, a big data functionality, a heuristic functionality, an analytics functionality, a rules engine functionality, a cognitive computing functionality, and/or the like) to determine an error identified in a ticket. Based on identifying the error, a ticket classification resource may generate another data event for a ticket resolution resource. In this case, project management platform 220 may determine a response action based on classifying the data event from the ticket classification resource and processing the data of the data event (e.g., an identification of the issue). For example, project management platform 220 may utilize a ticket resolution resource to determine to provide an alert, alter a project plan, generate code, alter a program, release a revised version of an application being developed, roll back an update to an application, and/or the like.

In some implementations, project management platform 220 may provide data to the resource, may allocate computing resources to implement the resource. For example, based on providing a threshold size data set (e.g., millions of data points, billions of data points, etc.) to an analytics tool for processing, project management platform 220 may dynamically reallocate computing resources (e.g., processing resources or memory resources) to increase/decrease a resource allocation to the analytics tool to facilitate the processing of the threshold size data set, and/or the like. In this way, resource allocation for project management platform 220 better matches a task that is being performed, enabling more efficient resource allocation, while freeing up resources for other processing tasks when not needed. In this way, processing tasks are completed faster, and less memory is needed based on dynamically reallocating memory relative to a static allocation of resources for project management.

Additionally, or alternatively, project management platform 220 may cause data to be provided for display via client device 210 to obtain user input (e.g., a user recommendation, a user resolution, etc.). In this way, project management platform 220 resolves issues faster than with only automation, trains artificial intelligence faster (e.g., an AI integration learns from human resolutions), and allows a user to see errors in AI based resolution and override an AI resource (e.g., which avoids errors to critical systems). For example, based on determining a score relating to processing data (e.g., a confidence metric for a response action that is determined), and determining that score does not satisfy a threshold, project management platform 220 may provide information for display via a user interface of client device 210 to request user assistance in resolving the information, thereby improving project management using human-AI interaction relative to another technique using only human or only AI based project management.

In this way, project management platform 220 may process data relating to the data event using the resource.

As further shown in FIG. 4, process 400 may include performing a response action based on processing the data relating to the data event using the resource (block 450). For example, project management platform 220 may perform the response action based on processing the data relating to the data event using the resource. A response action may include providing an alert, generating a calendar event (e.g., for a meeting relating to a data event, such as an error), assigning a task to a developer, assigning developers to a shift, generating an adaptation tool, altering a resource selected for a client (e.g., switching AI resources), generating program code (e.g., using a code generation tool, based on obtaining code from a similar project with a similar functionality—authentication code to include authentication in software), providing information in a user interface (e.g., generate the user interface, include information in the user interface, such as a query from a virtual agent, a response from a virtual agent, etc. based on an AI technique being used), and/or the like.

Additionally, or alternatively, project management platform 220 may cause a user interface to be displayed via client device 210, provide data to tool platform 250 for execution/analysis via tool platform 250, provide an alert to a calendar application of client device 210, cause a task assignment to be provided via client device 210, alter program code stored via project management platform 220, and/or the like.

In this way, project management platform 220 may perform a response action based on processing the data relating to the data event using the resource.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The project management platform can automatically manage multiple phases of a software development project and dynamically alter and integrate AI tools to permit natural language processing interaction with the platform. Multiple different AI resources can be selected and applied to different parts of the project, enabling faster processing, project completion, and a reduction in overall utilization of extraneous or unnecessary resources. Resource allocation is more efficient and can better match specific tasks to be performed. AI can be trained faster, AI errors can be noticed by a user, or specific AI can be overridden by a user through processing data or quantifying and qualifying certain performance metrics.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
 one or more processors to:
  detect a data event related to a project associated with a project management platform,
   the project management platform being associated with a compartmentalized liquid architecture configuration, and
   the compartmentalized liquid architecture configuration including a plurality of layers including:
    a delivery tool layer,
    an integration layer,
    a data acquisition layer,
    an automation layer, and
    an artificial intelligence (AI) layer;
  classify the data event based on a set of classification criteria;
  select a resource of a plurality of resources associated with the project management platform based on classifying the data event,
   the resource being included in a particular layer of the plurality of layers;
  process data relating to the data event using the resource; and
  perform a response action based on processing the data relating to the data event using the resource,
   the response action including at least one of:
    a generation of a calendar event,
    an assignment of a task to a developer,
    an assignment of a developer to a shift,
    a generation of a tool,
    an alteration of the resource, or
    a generation of a program code.

2. The device of claim 1, where the delivery tool layer includes a set of client-side tools associated with a user of the project management platform; and
 where the project management platform is to communicate with at least one tool of the set of client-side tools using a tool adapter generated to adapt information between a first data format associated with the project management platform and a second data format associated with the at least one tool of the set of client-side tools.

3. The device of claim 1, where the integration layer includes at least one of:
 a tool adapter to adapt a data format for a client-side tool,
 an application programming interface (API), or
 an enterprise service bus (ESB).

4. The device of claim 1, where the data acquisition layer includes at least one of:
 a transactional store,
 a machine learning engine, or
 a data lake.

5. The device of claim 1, where the automation layer includes a set of automation layer resources of the plurality of resources,
 the set of automation layer resources including at least one of:
  an automation store resource,
  a command center resource,
  a virtual agent resource, or
  an automation arcade resource.

6. The device of claim 5, where the automation layer includes an application programming interface (API) to permit communication between the set of automation layer resources and one or more other resources of the plurality of resources.

7. The device of claim 5, where the set of automation layer resources are usable to perform at least one of:
 a development operation for the project,
 a maintenance operation for the project,
 a testing operation for the project, or
 a management operation for the project.

8. The device of claim 1, where the AI layer includes a plurality of AI tools,
 at least one AI tool, of the plurality of AI tools, being selected for integration into the project management platform for the project.

9. A non-transitory computer-readable medium storing instructions, the instructions comprising:
 one or more instructions that, when executed by one or more processors, cause the one or more processors to:
  detect a data event related to a project associated with a project management platform,
   the project management platform being associated with a compartmentalized liquid architecture configuration associated with a plurality of layers, the plurality of layers including:
    a delivery tool layer,
    an integration tool layer,
    a data acquisition layer,
    an automation layer, and
    an artificial intelligence (AI) layer;
  classify the data event based on a set of classification criteria,
   the set of classification criteria relating to at least one of:
    a type of the data event,
    a source of the data event, or
    a type of the project;
  select a resource of a plurality of resources associated with the project management platform based on classifying the data event,
   the resource being included in a particular layer of the plurality of layers;

process data relating to the data event using the resource; and perform a response action based on processing the data relating to the data event using the resource,
the response action including at least one of:
a generation of a calendar event,
an assignment of a task to a developer,
an assignment of a developer to a shift,
a generation of a tool,
an alteration of the resource, or
a generation of a program code.

10. The non-transitory computer-readable medium of claim 9, where the data event relates to a switch from a first AI tool, integrated into the AI layer, of the plurality of layers, for the project, to a second AI tool; and
where the one or more instructions, that cause the one or more processors to perform the response action, cause the one or more processors to:
reconfigure the project management platform to switch from the first AI tool to the second AI tool; and
process data relating to another data event using the second AI tool.

11. The non-transitory computer-readable medium of claim 9, where the data event relates to a ticket identifying an error associated with the project; and
where the one or more instructions, that cause the one or more processors to select the resource, cause the one or more processors to:
select a particular AI tool, of a plurality of available AI tools, based on a characteristic of the particular AI tool and a characteristic of the ticket; and
where the one or more instructions, that cause the one or more processors to process the data relating to the data event, cause the one or more processors to:
provide the data relating to the ticket to the particular AI tool for processing; and
receive a result from the particular AI tool,
the result identifying an automatic resolution to the error associated with the project.

12. The non-transitory computer-readable medium of claim 9, where the data event relates to a natural language interaction with a user interface of the project management platform; and
where the one or more instructions, that cause the one or more processors to select the resource, cause the one or more processors to:
select a particular AI tool, of a plurality of available AI tools, to perform natural language processing of a message associated with the natural language interaction; and
where the one or more instructions, that cause the one or more processors to process the data relating to the data event, cause the one or more processors to:
provide the message to the particular AI tool for processing; and
receive a result of processing by the particular AI tool,
the result identifying a response to the message for display via the user interface.

13. The non-transitory computer-readable medium of claim 9, where the data event relates to a requirement for the project; and
where the one or more instructions, that cause the one or more processors to select the resource, cause the one or more processors to:
select a particular AI tool, of a plurality of available AI tools, to determine an alteration to a project plan to incorporate the requirement into the project; and
where the one or more instructions, that cause the one or more processors to process the data relating to the data event, cause the one or more processors to:
provide the requirement to the particular AI tool for processing; and
receive a result from the particular AI tool,
the result identifying analytics relating to the alteration to the project plan for utilization for the project.

14. The non-transitory computer-readable medium of claim 9, where the one or more instructions, when executed by the one or more processors, further cause the one or more processors to:
determine a projected computing resource utilization associated with processing the data using the resource; and
allocate computing resources to implement the resource based on the projected computing resource utilization,
the computing resources including memory resources or processing resources.

15. The non-transitory computer-readable medium of claim 9, where the one or more instructions, when executed by the one or more processors, further cause the one or more processors to:
communicate with a client device to cause information identifying the response action to be provided for display via a user interface of the client device.

16. A method, comprising:
detecting, by a device, a data event related to a project associated with a project management platform,
the project management platform including a plurality of layers including:
a delivery tool layer to provide one or more tools associated with managing portions of the project,
an integration layer to integrate the one or more tools into the project management platform for the project,
a data acquisition layer to obtain data regarding the project,
an automation layer to automate tasks associated with the project,
the automation layer being associated with automating at least one of:
a set of development operations,
a set of maintenance operations,
a set of management operations, or
a set of testing operations, and
an artificial intelligence (AI) layer to process data relating to the project using one or more AI integrations;
classifying, by the device, the data event based on a set of classification criteria;
selecting, by the device, a resource of a plurality of resources associated with the project management platform based on classifying the data event,
the resource being included in a particular layer of the plurality of layers;
processing, by the device, data relating to the data event using the resource; and
performing, by the device, a response action based on processing the data relating to the data event using the resource,
the response action including at least one of:
a generation of a calendar event,
an assignment of a task to a developer,
an assignment of a developer to a shift,
a generation of a tool,
an alteration of the resource, or
a generation of a program code.

17. The method of claim 16, where the automation layer includes a set of automation functionalities,
   the set of automation functionalities including at least one of:
   an automation store,
   a command center,
   a virtual agent, or
   an automation arcade.

18. The method of claim 16, where the integration layer includes a set of tool adapters to adapt messages between a first data format of the project management platform and one or more second data formats of the one or more tools of the delivery tool layer.

19. The method of claim 16, where the automation layer includes a particular tool to automatically resolve tickets associated with the project during a maintenance operation.

20. The method of claim 16, where the automation layer includes a particular tool to provide natural language interfacing via a user interface associated with the project management platform.

* * * * *